Jan. 12, 1960 G. E. UNDY 2,921,292

DUAL CHANNEL RECEIVER AND TRANSMITTER

Filed July 14, 1954

INVENTOR.

Gustav E. Undy

BY

Harness, Dickey & Pierce

ATTORNEYS.

United States Patent Office 2,921,292
Patented Jan. 12, 1960

2,921,292

DUAL CHANNEL RECEIVER AND TRANSMITTER

Gustav E. Undy, Detroit, Mich., assignor to Multi-Products Co., Hazel Park, Mich., a corporation of Michigan Application July 14, 1954, Serial No. 443,212

19 Claims. (Cl. 340—171)

Figures 1, 2:
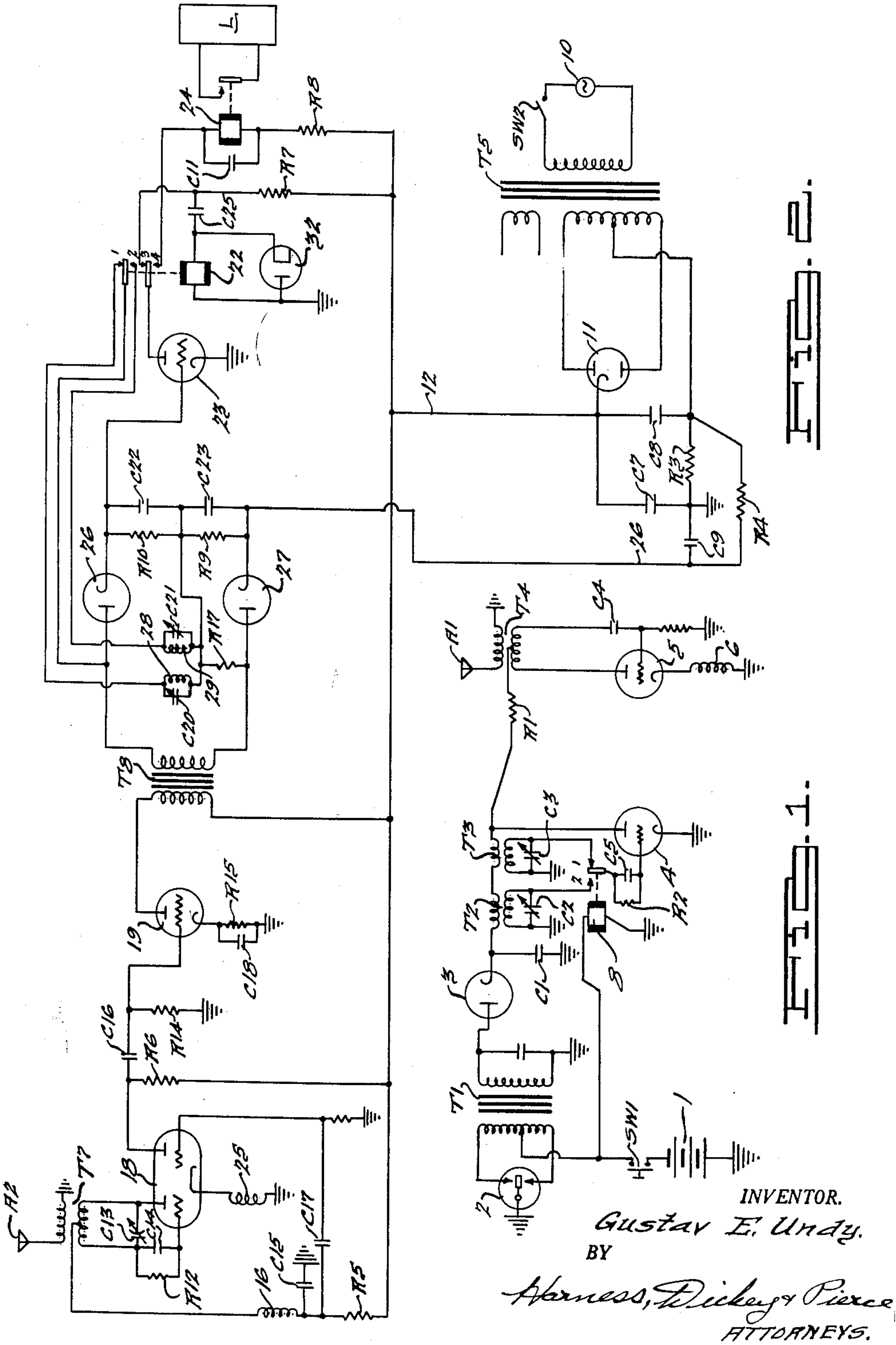

This invention relates to radio controlled remotely operated apparatus, and more particularly to radio controlled apparatus responsive to plural-frequency signals.

Remotely controlled devices are frequently actuated by alternating-current signals transmitted in the form of an amplitude-, frequency-, or phase-modulated carrier. Since but a limited number of appropriate carrier frequencies is usually available, coding of paired transmitters and receivers has normally been accomplished through variations in the frequency of the modulating signal. However, to permit reasonable tolerances in the manufacture of equipment and to avoid the necessity of frequent readjustment of the equipment, relatively low-Q tuned circuits must be employed. Additionally, the modulating frequency must be selected to permit simple translation into a control voltage and desirably is selected to permit the use of inexpensive components. As a consequence, the number of discrete channels for control-signal communication is limited.

It is consequently proposed that a carrier be modulated by a plurality of signals of different frequencies whereby the employment of the permutations of a relatively few basic modulating frequencies will produce an adequate number of discrete codes to avoid spurious or improper operation of receptor equipment.

It is therefore an object of the present invention to improve the capabilities of a transmitter without a proportionate increase in the cost of the transmitter equipment.

Another object of the invention is to improve the responsive capabilities of a radio receiver and particularly to render a receiver responsive to a plurality of incoming signals without extensive additions to standard receiver equipment.

A feature of this invention is a transmitter capable of producing a carrier signal modulated successively by two modulating frequencies.

Another feature of this invention is a transmitter controlled by a single switch and operative while the switch is depressed to transmit a carrier signal modulated by a first frequency and operative for a timed period after the release of the switch to transmit the carrier signal modulated by a different frequency.

Another feature of this invention is a radio-frequency receiver capable of operating a load device only upon the receipt of an appropriate carrier frequency successively modulated by two or more appropriate modulating frequencies.

A further feature of this invention is a network capable of developing a controlling direct voltage in response to the receipt of a signal of either a first or a second frequency but insensitive to input signals of other frequencies.

Another feature of this invention is a network capable of responding to an input signal of a selected frequency and operative thereafter to become sensitive to input signals of a different frequency.

Another feature of this invention is a network responsive only to an input signal of one frequency to operate a control device which in turn so modifies the network as to render it responsive to input signals of a different frequency.

Other objects and features will become apparent from a consideration of the following detailed description of one embodiment of the invention when read with reference to the accompanying drawings in which:

Figure 1 is a schematic drawing of a transmitter embodying certain of the principles of the invention; and Fig. 2 is a schematic representation of a receiver embodying certain other principles of the invention.

Referring first to Fig. 1 of the drawings showing an exemplary transmitter, upon the closure of switch SW1, which may be a key, a relay contact or any other suitable switching instrumentality, the potential of battery 1 is applied to the center tap of the primary winding of transformer T1 and thence to the winding and contacts of a self-interrupting interrupter 2 of any suitable conventional type. Since the exemplary transmitter is presumed to be adapted primarily for use in a mobile installation, it is assumed that only a low voltage battery 1 is available and that an interrupter 2 and associated circuitry must be provided to develop an appropriate potential for use in the electronic circuitry. The interrupter 2 operates in a normal fashion alternately to ground the ends of the primary winding of the transformer T1 to induce in the secondary winding of that transformer an alternating voltage. The alternating voltage appearing at the secondary winding of T1 is rectified by means of a diode 3 which is so poled that the cathode thereof assumes a positive voltage with respect to ground. Capacitor C1 in performing its filtering function, becomes positively charged.

The positive potential appearing at the cathode of diode 3 is applied through the primary windings of transformers T2 and T3 in series to the anode of triode 4, and through resistor R1 and half of the primary winding of transformer T4 to the anode of triode 5 to provide plate potential for those tubes. The anode and control grid of triode 5 are intercoupled by means of the primary winding T4 and capacitor C4 and the cathode of tube 5 is grounded through inductor or choke 6 so that the network including tube 5 functions as a radio-frequency oscillator, inducing in the secondary winding of transformer T2 and transmitting over antenna A1 a radio-frequency signal which is preferably in the order of 10 megacycles a second in frequency.

The radio-frequency signal transmitted by means of the oscillator including tube 5, is modulated, preferably at an audio rate, by means of triode 4 and its associated circuits. Thus, with switch SW1 depressed so that relay 8 is operated over an obvious circuit, a connection is established through the No. 2 front contact of relay 8 between a parallel tuned network, comprising the secondary winding of transformer T2 and variable capacitor C2, and the control grid of tube 4 through the grid-leak bias resistor R2 and its by-pass capacitor C5. Since the anode of tube 4 is thereby tunably coupled to the control grid of tube 4 by this regenerative feedback network, tube 4 and its associate circuits function as a form of the so-called tickler-coil oscillator, producing a signal which is applied through transformer T4 as a signal modulating the aforesaid carrier frequency. This first modulating frequency may be assumed to be in the audible range, such as 1,000 cycles per second.

As long as switch SW1 remains depressed, the transmitter shown in Fig. 1 will continue to transmit a radio-frequency signal modulated at a first, selected audio rate. When switch SW1 is released, the energizing circuit for relay 8 is terminated so that relay 8 releases to associate with the control grid of tube 4 the tuned circuit comprising the secondary winding of transformer T3 and variable capacitor C3. While the opening of switch SW1 also stops the operation of interrupter 2 thereby terminating the development of plate potential, capacitor C1 is charged to plate potential as beforesaid and will continue to provide plate voltage to triodes 4 and 5 until it is discharged therethrough. As a consequence, for a period of time which may be controlled through the selection of an appropriate value for capacitor C1, tube 5 contintues to generate a radio-frequency carrier, and tube 4 produces a modulating signal which is preferably of a frequency different than that previously produced. This second modulating frequency is also desirably in the audio-frequency range and may be assumed to be 12 kilocycles per second.

It will be apparent that while certain types of oscillators and an appropriate type of power supply have been disclosed, any other suitable type may be employed and that devices other than vacuum tubes may be employed to provide the gain requisite for oscillation and to provide the rectification required for supplying direct voltage to the oscillators.

The representative form of receiver disclosed in Fig. 2 of the drawings is assumed to be immobile and may therefore be connected to the power mains. As a consequence, a conventional type of alternating-current operated power supply is shown. At any time when switch SW2 is closed, the line power 10 will be applied to the primary winding of transformer T5 so as to induce a voltage in the secondary winding of that transformer. The ends of that secondary winding are connected to the anodes of a dual-diode 11 so as to produce at the cathode thereof a suitable positive voltage which is appropriately filtered by capacitors C7 and C8.

This positive potential on conductor 12 is applied through resistor R5, radio-frequency choke 16 and through half of the secondary winding of input transformer T7 to the anode of the left-hand section of tube 18. That potential is also applied through load resistor R6 to the right-hand section of tube 18, and through the primary winding of transformer T8 to the anode of amplifier 19. When this positive potential is first applied to conductor 12, it will be seen that current will flow through resistor R7, capacitor C25 and the winding of relay 22 to ground whereby relay 22 is or may be momentarily operated during the high charge rate period of capacitor C25. However, when capacitor C25 becomes charged to a suitable value, relay 22 will release and the momentary operation thereof, if it does occur during the initial connection of the device, produces no significant result. Assuming relay 22 to be released, the potential on conductor 12 is also applied through resistor R7 and through the No. 3 back contact of relay 22 to the anode of gating triode 23; whereas any time that relay 22 is operated the positive potential on conductor 12 is applied through resistor R8, through the parallel combination of capacitor C11 and the winding of relay 24, through the No. 4 front contact of relay 22 to the anode of gating triode 23. Thus, plate potential is supplied for each of the triodes in the receiver.

The center tap of the secondary winding of power transformer T5 is connected to ground through resistor R3 so that due to the potential drop across that resistor a voltage negative with respect to ground is applied through resistor R4, conductor 26, resistors R9 and R10 in series, and to the control grid of gating device 23, whereby tube 23 is biased negatively, preferably below grid cut-off or at least to the point where the plate current thereof is inadequate to produce any useful function. It will be noted that conductor 26 is grounded through capacitor C9 which is sufficiently large so that conductor 26 may be considered to be at alternating-current-ground potential.

The anode of the left-hand section of tube 18 is coupled to the grid of that section by means of a tuned circuit, comprising the center-tapped secondary winding of transformer T7 and variable capacitor C13, and by means of the grid-leak resistor R12 and its by-pass capacitor C14.

The cathode of tube 18, which is common to both sections of that tube, is grounded through inductor 25. With the value of capacitor C13 adjusted so that the tuned circuit is resonant at the selected carrier frequency, such as 10 megacycles, the left-hand section of tube 18 will function as a regenerative detector, developing across load resistor R5 an audio-frequency voltage corresponding to the modulating frequency. Inductor 16 and capacitor C15 are connected as a low-pass filter, with inductor 16 being selected to offer a high impedance to the carrier frequency but a low impedance to audio frequencies and capacitor C15 being selected to offer a high impedance to audio frequencies but to by-pass carrier-frequency signals to ground.

The audio-frequency alternating voltage developed across resistor R5 is applied through capacitor C17 to the control grid of the right-hand section of tube 18 to produce an amplified signal across load-resistor R6. This signal is coupled to amplifier 19 by means of coupling capacitor C16 and grid-return resistor R14. It will be noted that while the cathode of triode 19 is grounded through resistor R15 to provide cathode bias for the tube, resistor R15 is by-passed by capacitor C18 to prevent degenerative feed back and consequent gain reduction.

The output of tube 19 is applied through step-up transformer T8 to a network designed to produce a direct voltage output of sufficient amplitude to perform a given function only upon the application to the input thereof of an alternating-current signal of a selected frequency. A basic form of this network is disclosed and claimed in my copending application Serial No. 426,656, filed April 30, 1954.

With switch SW2 closed so that the receiver is operative, relay 22 will be in a released condition, as was hereinbefore described, so that its No. 1 back contact will be closed to connect the upper terminal of the secondary winding of transformer T8 and the anode of diode 26 to the tuned circuit comprising inductor 28 and variable capacitor C20. Consequently, the alternating voltage appearing across the secondary winding of transformer T8 is applied across a complex load comprising the aforesaid tuned circuit serially connected to resistor R17. The input alternating voltage will therefore be divided in accordance with its frequency. At the resonant frequency of the tuned circuit comprising inductor 28 and capacitor C20, the impedance of that tuned circuit is at its highest value so that a relatively large alternating voltage appears across that impedance network and a relatively small alternating voltage is developed across resistor R17. At any frequency above or below that resonant frequency the impedance presented by the tuned circuit is less than it is at resonance so that a smaller alternating voltage appears across that impedance network and a larger alternating voltage is developed across resistor R17. It will be noted that if a series-tuned circuit is employed in lieu of the disclosed parallel-tuned circuit, the operation of this combinational network will be reversed from that above-described.

The alternating voltage appearing across the impedance network comprising inductor 28 and capacitor C20 is applied through a circuit comprising the No. 1 back contact of relay 22, diode 26, and resistor R10 in parallel with capacitor C22. Due to the rectifying action of diode 26, a direct voltage will be developed across resistor R10 having an amplitude which is a direct function of the amplitude of the alternating voltage appearing across the aforesaid tuned circuit. Similarly the alternating voltage developed across resistor R17 is applied over a circuit including diode 27 and resistor R9 in parallel with capacitor C23 so that a direct voltage is developed across resistor R9 having an amplitude which is direct function of the amplitude of the alternating voltage appearing across resistor R17. However, due to the polarity of the diodes 26 and 27, the voltages which are developed across resistors R10 and R9 will be of opposite polarities, that end of resistor R10 which is connected to the cathode of tube 26 being positive relative to the voltage at the tap between resistors R10 and R9, and that end of resistor R9 which is connected to the cathode of tube 27 being positive relative to the value of the potential at that center tap. Considering the voltage across resistor R10 as a positive voltage, and considering the voltage across resistor R9 as a negative voltage, at the resonant frequency of the tuned circuit comprising inductor 28 and capacitor C20 the positive voltage appearing across resistor R10 will be at its highest positive value while the voltage across resistor R9 will be at but a small negative value so that the voltage resulting from this series opposed action has a substantial positive amplitude. However, at any frequency other than the resonant frequency, a smaller positive voltage will appear across resistor R10 and a larger negative voltage will appear across resistor R9 so that the algebraic sum of these voltages will be either substantially negative or at worst but a small positive value.

It will be recalled that gating device 23 was negatively biased so that the plate current therethrough was insufficient to perform any useful function. The parameters of the circuits are so selected that the differential voltage appearing at the control grid thereof as a result of the receipt of an incoming signal of a frequency other than the resonant frequency of the tuned circuit comprising inductor 28 and capacitor C20 will be insufficiently positive adequately to overcome this bias. Consequently, gating device 23 remains closed and can perform no useful function. However, the differential voltage applied to the control grid of tube 23 as the result of the receipt of an incoming signal of the resonant frequency will be sufficiently positive to permit sufficient conduction through tube 23 to provide a discharge path for capacitor C25. The discharge path includes the parallel circuit comprising diode 32 and the winding of relay 22, but the direction of the current during discharge is such that device 32 has a very low value of resistance to that current so that insufficient discharge current passes through the winding of relay 22 to operate the relay.

Therefore, the primary discharge path for capacitor C25 is through the anode-cathode path of tube 23, through ground, and through the anode-cathode path of diode 32. Therefore, with the parallel-tuned circuit comprising inductor 28 and capacitor C20 being tuned to the frequency of the first modulating signal, which was assumed to be 1,000 cycles per second, upon the appearance of a demodulated signal at the secondary winding of transformer T8 of a frequency of 1,000 cycles per second gating device 23 will be opened to permit the discharge of capacitor C25 therethrough.

This condition will continue as long as the incoming signal continues, i.e. as long as switch or key SW1 at the transmitter continues to be depressed. When, however, switch SW1 is released to cause transmission of the carrier signal modulated by the second audio frequency, assumed to be 12 kilocycles per second, the application of a positive enabling voltage to the control grid of tube 23 will be terminated so that gating device 23 will be closed, permitting capacitor C25 to again charge to plate potential over a path from conductor 12, resistor R7, capacitor C25 and the parallel combination of tube 32 and the winding of relay 22. However, tube 32 presents a high resistance to current flow in this direction so that the primary current path is through the winding of relay R22 to cause the operation of that relay.

Relay R22, in operating, disconnects the tuned circuit comprising inductor 28 and capacitor C20 from the anode of diode 26 and establishes a connection from the anode of tube 26 through the No. 2 front contact of relay R22 to the tuned circuit comprising inductor 29 and variable capacitor C21. The parameters of this tuned circuit are selected so that the circuit is resonant at the second selected audio frequency of 12 kilocycles per second. As a consequence, the system operates as before described to apply an enabling potential to gate 23 if the received signal is at the second selected audio frequency but not to enable gating device 23 if the second received signal is not of the appropriate frequency. If the latter condition exists the receiver will perform no useful function. If, however, the second received signal is of the appropirate audio frequency, gating device 23 will be again opened. As a result, plate current will flow from the potential on conductor 12, winding of relay 24, No. 4 front contact of relay 22 and through the anode-cathode path of tube 23 to ground, operating relay 24.

Capacitor C11, connected in shunt of relay 24, is provided to prevent operation of relay 24 on any momentary spurious incoming signal and to insure that relay 24 will remain operated for a suitable period even though the transmitter ceases operation prematurely. It will be noted, however, that the value of condensor C1 in the transmitter should be selected to insure that the second selected frequency will be transmitted sufficiently long to permit operation of relay 24 in the receiver.

Relay 24, in operating, closes its front contact to operate a suitable load device such as a mechanism for controlling the opening or closing of garage doors, or any other remotely controlled device.

It will be noted that while relay 22 is operated for but a short period while capacitor C25 charges, the parameters of this circuit are such that relay 22 is operated adequately long to perform the above-described functions. After this period, relay 22 again releases to release relay 24. Upon termination of the received incoming signal, gating device 23 again blocks so that the receiver circuits are restored to normal in preparation for further operation.

It will again be recognized that while certain types of circuits have been disclosed in the receiver and while vacuum tubes are shown, other equivalent circuits may be readily employed and devices other than vacuum tubes, but capable of performing similar functions, may be used.

It is to be recognized that the disclosed embodiment of the invention is but exemplary and that the invention is susceptible to modification and variation without departing from the proper and fair meaning of the following claims.

What is claimed is:

1. In a control system, a two-position switch, means effective when said switch is in one position for generating a signal of a first frequency, and means effective when said switch is in the other position for generating a signal of a different frequency, and means effective a preselected time interval after said switch is moved to said other position and effective while said switch remains in said other position for terminating the generation of said different-frequency signal.

2. In a control system, a two-position switch, an oscillator, a source of power for said oscillator, means effective when said switch is in one position for tuning said oscillator to a first frequency of oscillation, means effective when said switch is in the other position and effective even though said switch remains in said other position for tuning said oscillator to a different frequency of oscillation, and means including said switch and said source for causing said oscillator to oscillate from a time after said switch is moved to said one position to a time which is a preselected interval after said switch is moved from said one to said other position.

3. In a control system, a normally open switch, a normally quiescent oscillator, means effective when said switch is closed for causing said oscillator to oscillate at a first frequency, and means effective when said switch is thereafter opened and effective even though said switch remains opened for causing said oscillator to oscillate at a different frequency for a timed interval only.

4. In a control system, an oscillator comprising an electron-discharge device, a power supply for said device including a filter capacitor, and a network for said device, a first and a second tuned circuit, a two-position switch, means effective when said switch is in one position for connecting said first circuit in said network, means effective when said switch is in the other position for connecting said second circuit in said network, and means effective when said switch is in only said one of its positions for energizing said power supply, said power supply continuing to deliver power to said device after said switch is moved from said one to said other position for a period determined by the rate of discharge of said capacitor.

5. In a control system, an electron-discharge device, a network for said device, a first and a second tuned circuit, a switch, means effective when said switch is closed for connecting said first circuit in said network, means effective when said switch is thereafter opened for connecting said second circuit in said network, and means effective a timed intervals after said switch is opened and effective even though said switch remains opened for disabling said device.

6. In a control system, an electron-discharge device, a regenerative feedback network for said device, a first and a second tuned circuit, a switch, means effective when said switch is closed for connecting said first circuit in said network to cause said device to oscillate at a first frequency, means effective when said switch is opened for connecting said second circuit in said network to cause said device to oscillate at a different frequency, and means effective a timed interval after said switch is opened and effective even though said switch remains opened for disabling said device to oscillate.

7. In a control system adapted to receive an alternating-current signal of a first frequency followed by a second signal of a different frequency, apparatus normally responsive to said first frequency for producing a direct voltage exceeding a preselected amplitude, a gating device connected to said apparatus and operative in response to said direct voltage, a relay controlled by said gating device for rendering said apparatus operative in response to said second frequency to again operate said gating device, and a load device operative in response to the second operation of said gating device.

8. In a control system, a source of an alternating-current signal of a preselected frequency, first and second resonant circuit means, resistive means, control means for connecting said second resonant circuit means to said resistive means, rectifying means, and means including said first resonant circuit means, said rectifying means, and said resistive means responsive to said signal for operating said control means.

9. In a control system, a source of an alternating-current signal of a first frequency followed by a second signal of a different frequency, first and second resonant circuit means, resistive means, control means for connecting said second resonant circuit means to said resistive means, rectifying means, means including said first resonant circuit means, said rectifying means, and said resistive means responsive to said first signal for operating said control means, a load device, and means including said second resonant circuit means, said rectifying means, and said resistive means responsive to said second signal for operating said load device.

10. In a control system, means for generating a carrier signal, a two-position switch, means effective when said switch is in a first position for modulating said carrier with a signal of a first audio frequency, means effective when said switch is in the other position for modulating said carrier with a signal of second audio frequency, demodulating means, a voltage-responsive gating device, apparatus responsive to said first signal for developing a direct voltage for operating said device, and means controlled by said gating device for rendering said apparatus responsive to said second signal.

11. In a control systems, means for generating a carrier signal, a two-position switch, means effective when said switch is in a first position for modulating said carrier with a signal of a first audio frequency, means effective when said switch is in the other position for modulating said carrier with a signal of a second audio frequency, demodulating means, a voltage-responsive gating device, apparatus responsive to said first signal for developing a direct voltage for operating said gating device, a load device, means controlled by said gating device for connecting said load device to said gating device, means controlled by said gating device for rendering said apparatus responsive to said second signal, and means including said apparatus and said gating device responsive to said second signal for operating said load device.

12. In a control system adapted to receive an alternating-current signal of a first frequency followed by a second signal of a different frequency, frequency-sensitive circuit means normally responsive to said first frequency, means including said circuit means responsive to said first signal for producing a direct voltage having a critical amplitude, and means responsive only to said direct voltage for rendering said circuit means responsive to said second frequency and for causing said means including said circuit means to produce a critical-amplitude direct voltage only in response to the receipt of a signal of said second frequency.

13. In a control system adapted to receive an alternating-current signal of a first frequency followed by a second signal of a different frequency, a load device, tunable circuit means for producing an output signal to operate said load device solely in response to the receipt of a signal of the frequency to which it is tuned, said circuit means normally being tuned to said first frequency, and means including said circuit means responsive only to the cessation of said first signal for tuning said circuit means to said second frequency.

14. In a control system adapted to receive a first alternating-current signal of a first frequency followed by a second signal of a different frequency, control means operable in response to a voltage of a critical magnitude, first and second resonant means tuned to said first frequency and said different frequency respectively, rectifying means, means including said rectifying means and said first resonant means and responsive to said first signal for applying a voltage of said critical magnitude to said control means, a load device, and means including the same said rectifying means and said second resonant means effective in response to operation of said control means and to said second signal for actuating said load device.

15. The combination of claim 14 in which said first and second resonant means are tuned inductance-capacitance circuits, in which said control means includes a relay having contacts which normally connect first resonant means in circuit with said rectifying means, and in which the actuation of the relay connects said second resonant means in circuit with said rectifying means.

16. The combination of claim 14 in which said control means includes an electron discharge device and a relay having contacts which normally connect the winding of said relay to said electron discharge device and which normally connect said first resonant means in circuit with said rectifying means, in which said electron discharge device is actuated at the receipt of said first signal and deactuated at the termination of said first signal, in which said relay is actuated in response to the deactuation of said electron discharge device at the termination of said first signal, and in which actuation of said relay connects said load device in circuit with said electron discharge device and connects said second resonant means in circuit with said rectifying means.

17. The combination of claim 14 in which said control means includes an electron discharge device and a relay having contacts which normally connect the winding of said relay to said electron discharge device and which normally connect said first resonant means in circuit with said rectifying means, in which said electron discharge device is actuated at the receipt of said first signal, in which said relay is actuated by said electron discharge device, and in which actuation of said relay connects said load device in circuit with said electron discharge device and connects said second resonant means in circuit with said rectifying means.

18. The combination of claim 17 further including a capacitor connected in circuit with the winding of said relay and means for charging said capacitor, in which said capacitor discharges through said electron discharge device upon actuation of said electron discharge device responsive to said first signal, and in which said capacitor charges through the winding of said relay upon the deactuation of said electron discharge device to operate said relay.

19. The combination of claim 17 in which said means including said rectifying means and said first resonant means applies a voltage of said critical amplitude to said electron discharge device in response to said second signal and in which said load device is actuated in response to the second actuation of said electron discharge device.

References Cited in the file of this patent

UNITED STATES PATENTS

| | | |
|---|---|---|
| 2,150,241 | Nichols et al. | Mar. 14, 1939 |
| 2,293,869 | Vaughan | Aug. 25, 1942 |
| 2,379,631 | Finckh | July 3, 1945 |
| 2,392,672 | Koch | Jan. 8, 1946 |
| 2,457,730 | Roberts | Dec. 28, 1948 |
| 2,500,212 | Starr | Mar. 14, 1950 |
| 2,523,315 | Mayle | Sept. 26, 1950 |
| 2,554,329 | Hammond | May 22, 1951 |
| 2,724,049 | Ronault | Nov. 15, 1955 |

FOREIGN PATENTS

| | | |
|---|---|---|
| 161,817 | Australia | July 10, 1952 |